Patented July 26, 1938

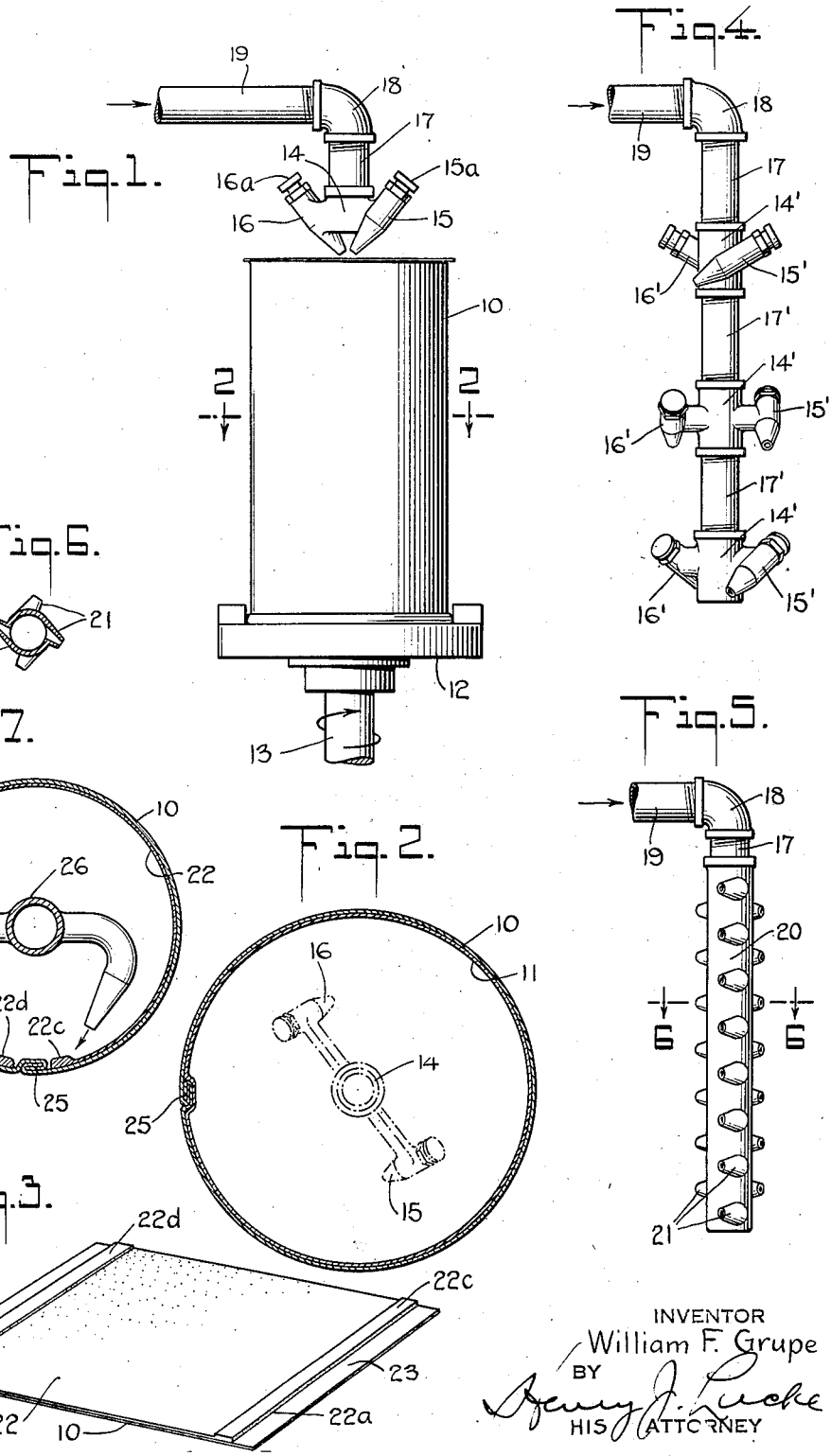

2,124,853

UNITED STATES PATENT OFFICE 2,124,853

METHOD OF MAKING COATED CANS

William F. Grupe, Lyndhurst, N. J., assignor to Chambon Corporation, Garfield, N. J., a corporation of New York Application March 17, 1936, Serial No. 69,261

5 Claims. (Cl. 113—120)

My present invention is directed to an improved method of effecting continuity of coating upon the interior of a container of the nature of a can.

Heretofore, and pursuant to present commercial practice, containers of the nature of a can have been formed of tinned steel or iron upon the inner face of which a coating of varnish has been applied prior to the stage of forming the can. In the stage of forming such pre-coated material into a can, it is necessary to solder the joint. In such soldering operation, the temperature required for the flow and bonding of the solder causes the coating immediately adjacent the joint to be over-baked, frequently charred, thus destroying the protective qualities of such coating. The temperature of soldering also causes a flow of the coating material in direction away from the joint.

It has also been proposed to form containers of the nature of a can from tinned steel or iron and applying a coating of varnish upon the inner surfaces of the can by spraying. However, such procedure has not proven successful, principally by reason of impracticability of insuring a continuous film across the gap of the seam, caused by the contraction of the coating upon hardening, thus exposing metal at the joint.

Pursuant to my invention, containers of the nature of cans are formed from suitable sheet material precoated continuously over the area of the inner surface of the sheet material excepting at the edge portions to be bonded with solder, such coating at the areas immediately adjacent to the uncoated edge portions having either an extra heavy thickness of such coating or an extra layer of the same or other suitable coating material. Upon completion of the soldering stage, the formed can is subjected to a suitable medium, such as heated air, under pressure and projected over paths of flow causing the thus heated and flow-rendered extra coating and/or extra thickness of coating to flow over the exposed soldered areas inclusive of the gap of the soldered joint, thus effecting continuity and substantial uniformity of coating upon the whole of the inner surfaces of the can. In such treatment, substantially the whole of the coating material is brought to flowable status, but by reason of the distribution of the projected streams of the heated medium substantially uniform thickness of coating is maintained. Also, by such treatment, possible disturbance and/or breakage of the coating material, ensuing in the various fabricating operations, handling and the like, are eradicated by my heated medium treatment.

Preferably, the heated medium treatment comprises projected streams directed toward and from opposite directions relative to the soldered seam, thus causing the extra coating and/or extra thickness of coating to flow toward one another and merge over the soldered areas and within and spanning the gap of the soldered seam.

The heated air, or equivalent, may be projected through a multiple nozzle assembly, the individual nozzles of which may be orientated vertically and horizontally at variant angles to one another. The platform or equivalent supporting a can to be treated is mounted in suitable relation to such multiple nozzle assembly to bring into proper operative relation and support of the can during the stage of heated medium treatment, as by mounting the nozzle assembly stationarily and such platform reciprocable relative to the nozzle assembly, or vice versa, or both reciprocable relatively to one another. If preferred, the platform supporting the can, may be rotated or otherwise displaced relative to the interior of the can.

My invention contemplates the employment of a protective coating applied, as aforesaid, wholly over the "inner" face of the body material of the can—excepting at the metal exposed to-be-folded seam areas—which possesses the characteristics of withstanding the temperature range of soldering and other heat treatment, thus resisting over-baking, charring, becoming brittle and/or other deterioration. My invention also contemplates the use of a protective coating applied on the "inner" face of the body material of the can which possesses physical characteristics of retaining its solid status, i. e., not flowing, at the temperature range of soldering and other heat treatment. In the use of either of such types of protective coatings, and under other appropriate circumstances, the "extra" layer of coating material applied at one or both margins adjacent the metallic i. e. to-be-soldered seam areas, is of a character which is rendered flowable at the temperature of the heated medium treatment, and possesses the further characteristic upon attaining flowable status and distributed by the projective streams of the heated medium, of bonding with the exposed metallic seam areas, inclusive of the gap faces of the seam.

Further features and objects of my invention will be more fully understood from the following detailed description and the accompanying drawing, in which Fig. 1 is an elevational view indicating, diagrammatically, one manner of carrying out my invention, by mounting a can upon a rotary support, which may be rotated about a vertical axis;

Fig. 2 is a horizontal sectional view, on an enlarged scale, on line 2—2 of Fig. 1;

Fig. 3 is a perspective view of sheet material having applied thereupon a layer of coating material, pursuant to one form of my invention;

Fig. 4 is an elevational view of a preferred embodiment of multiple nozzle, applicable in carrying out my invention;

Fig. 5 is an elevational view of another embodiment of multiple nozzle for carrying out my invention;

Fig. 6 is a sectional horizontal view on line 6—6 of Fig. 5;

Fig. 7 is another embodiment of nozzle arrangement of the vertically superposed type shown in Figs. 5 and 6, illustrating particularly nozzles arranged in sets directed in opposing directions relative to the soldered seam.

In practicing my improved method a can 10, or other suitable container, is preferably pre-coated with a thermo-plastic varnish, or resinous varnish, or other suitable covering material of the nature of lacquer or varnish, capable of withstanding for an appreciable time period a temperature of the range of 180° F. and upwards, inclusive of the range of temperature for effecting pasteurization and canning temperature of food or other product to be packed in such cans. Such coating is designated 11, and is desirably applied to the sheet material of such can 10 prior to the stage of assembly into a can. Such coating is advantageously applied to such sheet material pursuant to the disclosure and as claimed in my co-pending application, Serial No. 63,594, filed February 12, 1936, entitled Method of producing containers and resulting product.

In practicing my invention I suitably position such can 10 upon a suitable platform 12, such platform 12 may be rotated, as by mounting the same upon a vertically arranged rotatable shaft 13, the rotation of such shaft being indicated by the thereto applied encircling arrow. Suitable means is provided for effecting substantially uniform distribution of the coating material relative to the inner surfaces of such can, inclusive of the gap faces of the seam and of the seaming material. Such suitable means may take the form of a nozzle 14 for the supply of the suitable medium, at a suitably elevated temperature and which medium is immune relative to the coating material.

One form of such nozzle is illustrated in Figs. 1 and 2 and comprises individual nozzles 15, 16, preferably oriented at an angle to the vertical, the axes of which are respectively directed downwardly and angularly relative to one another and in suitable relation to the inner surface of such can 10, to effect the desired distribution of projected air streams.

Specifically, such nozzle arrangement, as shown in Figs. 1 and 2, comprises a nipple 17 connected to and communicating with the interior of the body 14 of the nozzles 15, 16, an elbow 18 connected to such nipple 17 and piping 19 connecting such elbow 18 with the source of supply of such medium. The arrow appended to the piping 19 indicates the direction or flow of such medium. The respective individual nozzles 15, 16, as shown, are provided with individually adjustable volume regulating means, indicated at 15a, 16a, such as axially adjustable valves.

Advantageously, such medium is air heated to the above referred to range of temperature.

In Fig. 4 I have shown another form of nozzle arrangement comprising a plurality of vertically arranged sets of individual nozzles respectively designated 15', 16', corresponding generally to the aforesaid single set of nozzles 15, 16, illustrated in Figs. 1 and 2. Such sets of vertically superimposed nozzles 15', 16', are suitably mounted and connected to suitable piping leading to the source of the distribution-effecting medium, such as heated air, as aforesaid, the nozzle bodies 14' being connected in vertical seriatim by interposed nipples 17'.

Preferably, such sets of nozzles 15', 16', are arranged in angularly staggered relation about the vertical, relative to one another.

In Figs. 5 and 6 I illustrate another preferred embodiment of nozzle arrangement, corresponding generally to the aforesaid nozzle arrangement shown in Figs. 1 and 2, and also in Fig. 4. The nozzle arrangement shown in Fig. 5, in particular, comprises a vertically downwardly extending tube 20, provided at and about its cylindrical periphery individual nozzles 21 arranged in vertical superposition and angular relationship about the vertical. A form of specific construction of such tube body 20 and individual nozzles 21 is indicated in Fig. 6.

Such nozzle arrangement, as above referred to, or of other approved specific construction, may be suitably supported in the stationary position and to locate the respective individual nozzles in suitable relation, relative to the vertical axis of such can 10.

Assuming the nozzle arrangement to be stationary, the can may be rotated relative thereto, as indicated in Figs. 1 and 2. For a nozzle arrangement as shown in Figs. 4 and 5, assuming the vertically superposed nozzles to be mounted stationarily, the platform 12, or other support, for each can is arranged to be moved upwardly relative to the individual nozzles, preparatory for the treatment by the distribution-effecting medium, following which the respective cans are moved downwardly. It is not essential, or although applicable, that the can be rotated when subjected to the treatment of the distribution-effecting means as by a type of nozzle arrangement, such as is shown in Figs. 4 and 5, since the compounding flows of the angularly and staggeredly directed medium discharged through the nozzles effects uniformity of thickness and continuity of coating about the whole of the inner surfaces of the can inclusive of the soldered seam areas and the gap faces.

If preferred, the support 12 of a can 10 may be mounted to be stationary and the nozzle assembly mounted reciprocably relative to the can support, to afford downward movement of the nozzle assembly relative to the interior of the can, to effect proper operative relation of nozzle assembly and inner surfaces of the can preparatory of and during the stage of distribution treatment.

Desirably, the platform 12 or equivalent support of a can is part of a conveyor comprising a plurality of like platforms individually supporting a corresponding number of like cans, such conveyor being suitably mounted and operated to afford successive treatments of multiple groups of cans.

Fig. 3 illustrates the sheet material 10, of any individual can, bearing on its "inner" face a coating 22 of the above character, which coating extends from the margin 22a to the margin 22b continuously, and preferably substantially uniformly, but providing at the edge portions on such "inner" face the areas 23, 24, uncoated, that is to say, exposed metal, desirably tinned, which exposed metal areas 23, 24, afford seaming, see 25, Figs. 2 and 7, as by crimping and soldering, as is understood by those skilled in the art.

Most preferably, the varnish or lacquer or equivalent coating 22 comprises an extra thickness, see 22c, 22d, Fig. 3, of such coating 22, or extra layer of either of the above or other protective coating 22, either adjacent both exposed metal areas 23, 24, as shown in Fig. 3, or adjacent but one such exposed metal area.

For such form of initial arrangement of the protective coating 22, or other approved arrangement, it is expedient to provide projected streams of the heated medium, directed toward and from opposite directions whereby during the heated medium treatment such extra thickness or extra layer portions 22c, 22d, or singly, are positively distributed over and bonded upon the soldered seam areas 25, inclusive of the areas forming the gap of the seam, to merge continuously with the protective coating of the non-seam portions of the inner surfaces of the can.

Such opposingly directed nozzle assembly is illustrated, in one embodiment thereof, in Fig. 7, wherein 26 represents the hollow nozzle head such as the head 14 of the nozzle assembly of Figs. 1 and 2, or the head 14' of the nozzle assembly shown in Fig. 4, or the tube 20 of the nozzle assembly shown in Fig. 5. The individual nozzles 27, 28, either as a single set, or one set of a plurality of vertically superposed sets, are positioned at and directed opposingly from opposing sides relative to such protective coating portions 22c, 22d, and relative to the seam areas 25, as indicated by the applied arrows, to effect flow of such coating portions and thereto adjacent coating portions and eventual continuity of the coating upon and over the seam areas 25, inclusive of the seam gap areas.

By the above, or equivalent, heated medium treatment, like distribution of the protective coating upon and over the seam and seam gap areas connecting and between the side faces of the interior of the can and the bottom of the can, is effected by my process, whereby, upon completion of the treatment and cooling, the protective coating is distributed continuously and substantially uniformly over the whole of the inner faces of the can, inclusive of all seams and all seam gap areas.

If preferred, the protective coating 22, see Fig. 3, may be material of the varnish, lacquer or like type, which at the ranges of elevated temperatures, ensuing during the stage of soldering, heated medium treatment, pasteurizing, canning, and the like, maintains solid status, resists overbaking, charring, brittleness, etc., and the "extra" coating material, see 22c, 22d Fig. 3, either singly or both, being of material of protective quality, which is rendered flowable during the stage of the heated medium treatment, and merged and distributed over the exposed metal seam areas, inclusive of the gap faces and bonded thereto, thus completing the continuity of protective coating wholly upon and about the inner faces of the can.

Whereas, I have described my invention by reference to specific forms thereof, it will be understood that many changes and modifications may be made without departing from the spirit of the invention.

I claim:

1. The method of coating the interior of a metal container, which comprises applying the coating material upon the "inner" face of the metal container material while preserving metallically exposed the edge portion serving as the to-be-soldered seam areas, forming the container by seaming and soldering such seam areas, and subjecting the "inner" face of the thus formed container to projected streams of a heated fluid medium to render the applied coating material flowable and positively effecting the flow of the flowable-rendered coating material by such projected streams upon and over the seam areas.

2. The method of coating the interior of a metal container, which comprises applying the coating material upon the "inner" face of the metal container material while preserving metallically exposed the edge portions serving as the to-be-soldered seam areas, forming the container by seaming and soldering such seam areas, and subjecting the "inner" face of the thus formed container to heated fluid medium projected in diverging streams to render the applied coating material flowable while effecting relative movement between the container and the paths of flow of the projected diverging streams and positively effecting the flow of the flowable-rendered coating material by such projected stream upon and over the seam areas.

3. The method of coating the interior of a metal container, which comprises applying the coating material upon the "inner" face of the metal container material while preserving metallically exposed the edge portions serving as the to-be-soldered seam areas, forming the container by seaming and soldering such seam areas, and subjecting the "inner" face of the thus formed container to heated fluid medium projected from opposing sides of the seam areas in diverging streams to render the applied coating material flowable and positively effecting the flow of the flowable-rendered coating material by such projected stream upon and over the seam areas.

4. The method of making a metal container provided with an inner coating of protecting medium which comprises, first, coating the "inner" face of the metal container material with the protecting medium, leaving the end portions of the metal container material uncoated and providing relatively thickened portions of the protecting medium adjacent said uncoated end portions, second, joining the uncoated end portions of the metal container material to form a seam, and, third, rendering flowable under treatment by projected streams of a fluid medium under elevated temperature the protecting medium including its relatively thickened portions, and spreading the same continuously over the inner face of the metal container including the theretofore exposed faces of the seam.

5. The method of making a metal container provided with an inner coating of protecting medium which comprises, first, coating the "inner" face of the metal container material with the protecting medium, leaving the end portions of the metal container material uncoated and providing relatively thickened portions of the protecting medium adjacent said uncoated end portions, second, joining the uncoated end portions of the metal container material to form a seam, and, third, rendering flowable under treatment by streams of fluid medium projected from opposing sides of the seam areas under elevated temperature the protecting medium including its relatively thickened portions, and spreading the same continuously over the inner face of the metal container including the theretofore exposed faces of the seam.

WILLIAM F. GRUPE.